United States Patent Office 3,784,672
Patented Jan. 8, 1974

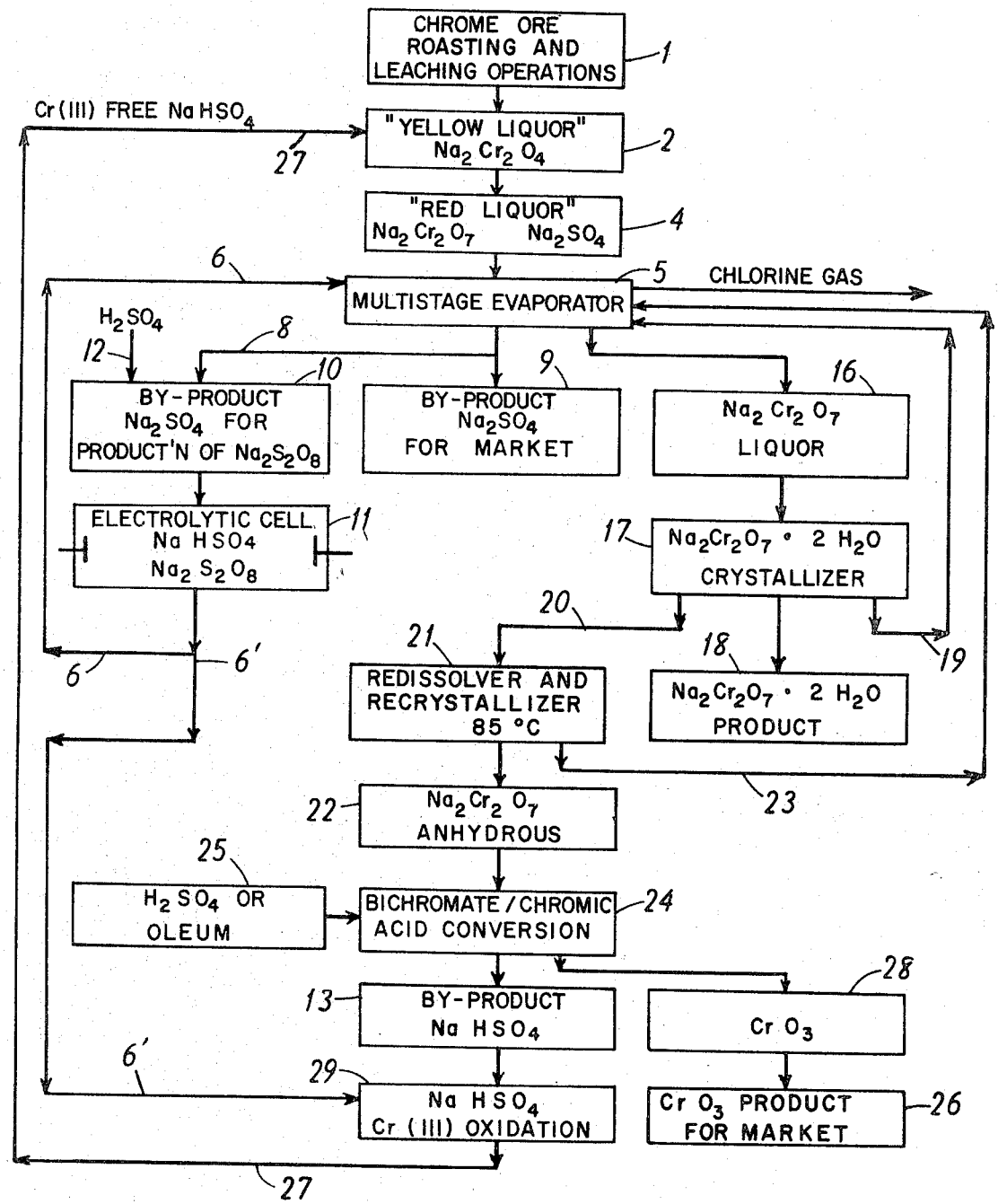

3,784,672
PROCESS FOR REDUCING THE TRIVALENT
CHROMIUM CONTENT OF ALKALI METAL
BISULFATE SOLUTIONS
Thomas R. Morgan and William W. Low, Syracuse,
Christian A. Wamser, Camillus, and Charles P. Bruen,
Fayetteville, N.Y., assignors to Allied Chemical Corporation, New York, N.Y.
Original application Oct. 19, 1972, Ser. No. 82,024, now Patent No. 3,715,425. Divided and this application Sept. 21, 1972, Ser. No. 290,911
Int. Cl. C01d 5/02, 5/16
U.S. Cl. 423—202                                    3 Claims

ABSTRACT OF THE DISCLOSURE

Chrome chemicals such as chromic acid ($CrO_3$) and alkali metal chromates and bichromates are prepared by a process which avoids the formation and treatment of "brown muds" which includes the processing steps of reacting an alkali metal bisulfate solution substantially free of trivalent chromium values with an aqueous solution of an alkaline roasted chrome ore mixture containing dissolved chrome ore values to convert the roasted mixture's chrome ore values at least in part to an alkali metal bichromate and separating said bichromate values. The alkali metal bichromate values may be reacted with a sulfuric acid to produce chromic acid. Also covered by the present invention is the removal of the chloride impurity from the bichromate values.

---

This is a division of application Ser. No. 82,024, filed Oct. 19, 1972, now U.S. Pat. 3,715,425, issued Feb. 6, 1973.

This invention relates to the production of hexavalent chromium compounds useful in the plating of metals, the tanning of leather, the manufacture of pigments, in chemical processing and in many other chemical processing industries. More particularly, this invention is directed to a process for the manufacture of chromic acid and alkali metal chromates and bichromate, which process permits the recovery and reuse of acid values, the elimination of troublesome and costly processing steps and the removal of chloride contamination.

Conventionally, alkali metal chromates, such as sodium chromate, which is a valuable product as well as the precursor for chromic acid, alkali metal bichromates, such as sodium bichromate, and other chromium compounds, are produced from chromite ore, such as $$FeOCr_2O_3$$

usually by high temperature alkaline oxidation followed by water leaching to produce a "yellow" liquor which is a solution of sodium chromate contaminated with sodium chloride. This method of preparing a chrome-containing solution from which the chrome values may be separated is preferred over other routes, such as the more cumbersome process involving pressure digestion of the chromite ore with sulfuric acid, using chromic acid as a catalyst, and separation of the metals by means of the crystallization of complex double salts with ammonium sulfate. Such a process involves high costs and there is no by-product utilization.

BACKGROUND OF THE INVENTION

In the past, it has been the practice to treat the crude chrome-containing solution ("yellow liquor") with an acidic material, usually sulfuric acid, to form the so-called "red liquor" which comprises a solution of alkali metal bichromate and by-product alkali metal sulfate contaminated with chloride ion. Less frequently, carbon dioxide has been used rather than sulfuric acid as the acidic material, in which case alkali metal bicarbonate rather than alkali metal sulfate is obtained as by-product and is recycled to the chromite ore alkaline oxidation step.

Another variation of the prior art has been the use of by-product alkali metal bisulfate as the acidic material obtained from the production of chromic acid in place of sulfuric acid in the production of bichromate. The value of the bisulfate as a saleable by-product of chromic acid preparation has presented a problem to the manufacturers of chromic acid because of the presence of both trivalent and hexavalent chromium as well as chloride ions originally present in the alkali (soda ash) used in the chromite ore alkaline oxidation step. While the by-product bisulfate from the chromic acid process may be utilized in the production of bichromates, thus eliminating the problem of disposing of sodium bisulfate, unfortunately its use has introduced other problems which have become increasingly severe as the production rate of chromic acid has increased.

The presence of hexavalent chromium in the bisulfate presents no problem since it can be returned to the process, but the trivalent chromium, also present in significant amounts, causes precipitation of a complex mixture known in the trade as "brown muds." These muds are somewhat gelatinous in character. As deposited, filtration is almost impossible, but they can be filtered (with great difficulty) if sufficient water is added and if the pH is held at about 5. The additional water increases the filtration load and subsequently the evaporative load increasing capital and fuel costs. Thus, the treatment of the "brown muds" represents a major filtration operation with attendant capital and operational costs. Furthermore, when the pH is not maintained in order to achieve filterability, conversion of the alkali metal chromate to bichromate is incomplete, and a further step is necessary to complete the conversion. If the muds are discarded after filtration, they represent a yield loss because of the chromium values, both trivalent and hexavalent, contained therein. Attempts to recycle these muds back to the initial high temperature alkaline oxidation step to insure minimum loss of chrome values introduces further problems in the leaching and washing operation which follows.

Another problem encountered in methods of the prior art is the halide ion, particularly chloride ion, contamination of the working solutions and products. The major portion of the chloride contaminant is introduced by the alkali used in the initial high temperature oxidation of the chromite ore and subsequent crystallization of the sodium bichromate. To reduce loss of the chrome values recycling is employed; and as a result, the chloride ion in the mother liquor accumulates to troublesome levels causing contamination of the final products. The chloride level, if not regulated and allowed to follow the product bichromate, could amount to as much as 0.5% $Cl^-$ on a $Na_2Cr_2O_7 \cdot 2H_2O$ basis. Such contamination adversely affects the performance of these compounds in pigments and electroplating operations, and often introduces serious corrosion problems during manufacture or utilization of these products. These halide ions must be removed one way or the other from the system. Various solutions to this problem are known to the art. For instance, employing a low chloride alkali will greatly diminish the problem, but add to the cost. The chloride ions can be removed from the working solutions by precipitation using silver ions (U.S. Pat. 2,639,216) or by electrolytic means (U.S. Pat. 3,454,478); these treatments, however, add to the cost of the chrome products produced.

In the prior art processes, the yellow liquor containing heavy traces of sodium chloride is acidified with an alkali metal bisulfate, preferably, the by-product bisulfate resulting from the chromic acid conversion step, described hereinbelow. The acidity of the reaction mixture is kept below about 5 wherein conversion to sodium bichromate is incomplete and the reaction mixture contains sodium bichromate, unconverted sodium chromate, sodium sulfate, sodium chloride, and the difficultly filterably "brown muds" comprising a complex containing trivalent chromium and hexavalent chromium values. The muds are removed by filtration, usually employing a silicious filter aid and either discarded or recycled to the initial chromite ore alkaline oxidation step. The filtrate is then treated with sulfuric acid to bring the pH to about 3.0, and the conversion of the remaining chromate to bichromate is completed. The resulting mixture is known in the trade as "red liquor" and comprises sodium bichromate, by-product sodium sulfate having market value, and sodium chloride.

Generally, the "red liquor" is then concentrated in an evaporator and the concentrated solution treated for the removal of chloride ions by one of several methods described above.

The concentrated liquid emerging from the evaporator is essentially sodium bichromate which is separated from the by-product sodium sulfate by fractional crystallization, and crystallized from the purified solution, as

$$Na_2Cr_2O_7 \cdot 2H_2O$$

product. The separated sodium sulfate called "chrome cake" is a saleable by-product.

In an integrated system chromic acid is produced by taking a portion of the product sodium bichromate

$$(Na_2Cr_2O_7 \cdot 2H_2O)$$

redissolved in an aqueous solution and recrystallized at a temperature above 85° C. to provide the anhydrous product, $Na_2Cr_2O_7$. The anhydrous sodium bichromate is then reacted with either sulfuric acid or oleum at about 200° C. to produce chromic anhydride ($CrO_3$) and sodium bisulfate ($NaHSO_4$). At the reaction temperature employed, the products chromic anhydride and the by-product $NaHSO_4$, exist essentially as immiscible liquid phases which are separated by conventional liquid/liquid separation techniques. However, during the above reaction the $CrO_3$ undergoes some thermal decomposition resulting in the formation of the lower-valent trivalent chromium in the form of decomposition products which are transferred into the bisulfate phase. It is this bisulfate by-product, containing trivalent chromium decomposition products, that is recycled to react with the "yellow liquor" containing sodium chromate to form the "red liquor" and "brown muds" described hereinabove.

PRESENT INVENTION

In accordance with the present invention, a new method is provided for producing chrome products which process avoids the production of "brown muds" and eliminates the need for foreign additives or additional steps to reduce the halide ion contamination.

As noted above, chromite ore, comprising essentially $FeOCr_2O_3$, is roasted with an alkali metal carbonate, such as soda ash or potassium carbonate and other alkaline material as CaO and MgO with the consequent formation of an alkali metal chromate. Conventional roasting temperatures normally employed are in the order of about 2000° to 2400° F. The alkali metal chromate, preferably sodium, is then extracted from the calcined mixture to produce a "yellow liquor" comprising essentially an aqueous solution of the alkali metal chromate. While hereinafter specific reference will be made to the sodium salts, it is intended to cover the other alkali metal salts within the scope of the present invention.

FIG. 1 is a schematic representation of the preferred processing of chromite ores for the production of chrome values according to the present invention.

Of the various acidic materials that can be reacted with the yellow liquor in the production of the solution of sodium bichromate (red liquor), the present invention employs the by-product sodium bisulfate resulting from the preparation of chromic anhydride ($CrO_3$). However, prior to the use of this by-product bisulfate, which contains traces of trivalent as well as hexavalent chromium, it is treated with sodium persulfate under oxidation conditions to convert essentially all of the trivalent chromium to hexavalent chromium (described hereinbelow). The reaction of the yellow liquor and bisulfate is carried out with agitation at a temperature of the order of 60°–80° C., by combining the acidic bisulfate and alkaline yellow liquor streams continuously. The operation is controlled by adjusting the flows of the streams to yield a product red liquor stream having a pH of the order of less than about 5, preferably about 3 which is characteristic of a solution containing bichromate and sulfate at the working concentration levels.

The "red liquor" comprising sodium bichromate sodium sulfate and traces of chloride prior to evaporation, is treated according to the method of the present invention so that the red liquor upon evaporation produces an essentially chloride-free sodium bichromate. To the red liquor is added an aqueous sodium persulfate solution, which preferably derived from the electrolytic oxidation of sodium bisulfate, described hereinbelow. The persulfate solution comprises a mixture of sodium bisulfate and sodium persulfate. This solution may be added to the "red liquor" either prior to, or during the evaporation step. The use of persulfate to remove chloride ion is found to be effective over a wide range of operating conditions. It is effective at essentially all degrees of acidity (pH<7), all bichromate concentrations varying from very dilute to saturated and all sulfate/bichromate concentration ratios up to approximately 2 mols $Na_2SO_4$ per mol of $Na_2Cr_2O_7$. This affords an effective and efficient method for removing the chloride ion in that the persulfate solution preferably is prepared from the by-product sodium sulfate and without the introduction of foreign ions into the system.

Evaporation of the red liquor containing the persulfate is conducted at temperatures between about 50° and 140° C. (boiling point of concentrated solution) preferably between 70° and 100° C. During evaporation the chloride ion is almost quantitatively oxidized to elemental chlorine, which readily volatilizes from the hot solution. During the evaporation and subsequent crystallization step of the process of our invention sodium biochromate dihydrate ($Na_2Cr_2O_7 \cdot 2H_2O$) is produced by separating the by-product sodium sulfate by fractional crystallization. This sodium sulfate, commonly referred to as "chrome cake" is essentially pure and can be sold as is.

In the preferred embodiment of the present invention, a portion of this sodium sulfate by-product may be utilized for the production of sodium persulfate by electrolytic means. The resulting persulfate is then used as an oxidizing agent, described hereinabove, for the oxidation of the chloride ion in the "red liquor" prior to or during the evaporation step. Also, the persulfate can be employed to convert by oxidation the trivalent chromium values to hexavalent chromium values in the sodium bisulfate solution used to treat the yellow liquor.

To prepare sodium persulfate from the by-product sodium sulfate, sulfuric acid is first added in stoichiometric amounts to a solution of the sodium sulfate, preferably the by-product from the evaporators, to produce a solution of sodium bisulfate. Alternatively, the sodium bisulfate by-product from the manufacture of chromic anhydride may be used. The solution containing from about 40 to 60% $NaHSO_4$, preferably from 50 to 60%, is oxidized by electrochemical means such as a diaphragm electrolytic cell to sodium persulfate. The operation of the electrolytic cell under optimum current efficiencies are obtained employing high electrolyte concentration, high anode current density, anode materials of high oxygen overvoltage (such as platinum or platinized metals) and temperatures in the range of about 0–30° C. The addition of small amounts of chloride ion increases the current efficiency. While the presence of the chloride ion in the process solution is normally avoided, the efficiency with which chloride may be removed by using the persulfate oxidation of it, as previously described, allows chloride addition at this point.

After the crystallization of the sodium bichromate, from which sodium sulfate has been separated by fractional crystallization, the hydrated bichromate crystals ($Na_2Cr_2O_7 \cdot 2H_2O$) may be separated and stored. To prepare chromic anhydride ($CrO_3$) the sodium bichromate is redissolved and recrystallized at a temperature in excess of 85° C. to obtain the anhydrous bichromate, $Na_2Cr_2O_7$, which is crystallized at temperatures between about 85° and 140° C. The anhydrous bichromate is then treated with a sulfuric acid, such as concentrated sulfuric acid or preferably oleum, to produce chromic anhydride ($CrO_3$) and by-product sodium bisulfate. This reaction is carried out at temperatures between about 196° and 210° C., preferably at temperatures between about 196° and 200° C. At these temperatures, both the product chromic anhydride ($CrO_3$) and the by-product sodium bisulfate ($NaHSO_4$) exist as essentially immiscible liquids which may be separated by conventional liquid/liquid phase separation techniques.

At these temperatures some of the molten $CrO_3$ undergoes thermal decomposition and the resulting lower-valent chromium (trivalent chromium) decomposition products transfer into the bisulfate phase. As a result, the bisulfate normally contains some hexavalent chromium compounds (from dissolved or dispersed $CrO_3$ not removed in the phase separation) and the trivalent chromium as well. If this by-product sodium bisulfate were utilized as the acidic agent in the conversion of the sodium chromate in the "yellow liquor" to the sodium bichromate in the "red liquor," described hereinabove, the hexavalent chromium values would be recovered and not interfere with the conversion, but the trivalent chromium values would interfere with the conversion of the chromate to bichromate and these trivalent chromium values would be lost, as the difficultly filterable "brown mud" previously described.

In another aspect of the present process, this by-product sodium bisulfate containing both hexavalent and trivalent chromium values is treated with sodium persulfate, preferably the sodium bisulfate-sodium persulfate mixture which was prepared by the electrochemical oxidation of sodium bisulfate in the electrolytic diaphragm cell, described above. The trivalent chromium is oxidized to hexavalent chromium according to the reaction:

$$Cr_2(SO_4)_3 + 3Na_2S_2O_8 + 7H_2O \rightarrow H_2Cr_2O_7 + 6NaHSO_4 + 3H_2SO_4$$

The oxidation of the trivalent chromium is carried out in the aqueous phase, preferably on the nearly saturated sodium bisulfate used in the process. Substantially all, i.e. about 90%, preferably about 95%, of the trivalent chromium can be oxidized in 3 hours at 60° C., using a stoichiometric quantity of the persulfate ($Na_2S_2O_8$), that is, approximately seven parts by weight of $Na_2S_2O_8$ for every part of trivalent chromium [Cr(III)]. The oxidation can be carried out at higher temperatures from 60° C. to the boiling point of the solution which is about 115° C. As the temperature is increased, the time required for complete oxidation is likewise decreased. At 70° C. the oxidation is found to be 90% complete in one hour. The reaction appears to be first-order with respect to trivalent chromium, with the rate of oxidation being proportional to the concentration of Cr(III) in the solution. Using temperatures above about 70° C. requires an increase in the amount of persulfate due to the thermal decomposition of the persulfate during the oxidation.

As with the chloride oxidation, one of the advantages of this method of Cr(III) oxidation using process streams generated in the system is that no foreign ions are introduced into the system. Another is that the reaction generates acid which not only is utilizable in the subsequent chromate-bichromate conversion, but more than compensates for the acid values consumed in the production of the persulfate. Other methods of oxidizing the Cr(III) in sodium bisulfate have been found less effective. For instance, the electrochemical oxidation of tri- to hexa-valent chromium in this medium proceeds with poor current efficiencies and requires the use of two-compartment cells with ion exchange membrane separators to minimize cathodic reduction of the hexavalent chromium in the system. In the case of chemical oxidation by sodium chlorate, ($NaClO_3$), the reaction is so slow that even at the boiling point, as much as 16 hours may be required to oxidize most of the Cr(III) with 200% excess of $NaClO_3$.

The by-product sodium bisulfate solution, in which substantially all of the trivalent chromium values have been converted to hexavalent chromium, can be used to convert the sodium chromate in the yellow liquor to sodium bichromate without dilution or final pH limitations and without precipitating "brown muds." The conversion operation can be continued without interruption to the finishing pH which is characteristic of complete conversion (about 3.0–3.5). In the conversion, the by-product sodium bisulfate is added with agitation to the "yellow liquor" containing sodium chromate at a temperature of between 25° and 120° C., preferably between 60° and 80° C., to produce "red liquor" containing sodium bichromate. Some sodium sulfate crystallizes out because the system does not have the additional water otherwise needed to improve the properties of the "brown mud" precipitate and facilitate filtration. The separation of the sodium sulfate along with traces of unoxidized trivalent chromium is easily achieved by centrifugation. This step desirably reduces the evaporative load in the subsequent processing of the "red liquor." All that might be required for a final Cr(III)-free "red liquor" feed for evaporation is a polishing filter which would be much smaller than the "brown mud" filtration system required in the conventional operation.

For a more complete understanding of the present invention, reference is made to the accompanying drawing in which:

FIG. 1 is a diagrammatic flow sheet of a chrome recovery process in which chrome ore 1 is subjected to a high temperature alkaline oxidation or roasting step, cooled and leached with an aqueous solution to produce the yellow liquor 2, comprising a solution of impure sodium chromate which is filtered to remove insoluble impurities from the roasted ore. The yellow liquor is acidified with the sodium bisulfate solution which is substantially free of trivalent chromium salts. This can conveniently be carried out in a tank provided with a stirrer and the reaction is very rapid. As shown in the flow sheet, the resulting product is red liquor 4, comprising an aqueous solution of sodium bichromate, sodium sulfate and sodium chloride. Table I contains pertinent data on this conversion.

TABLE I

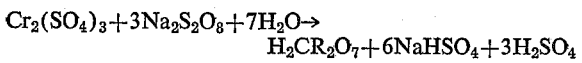

Conversion, $Na_2CrO_4$ to $Na_2Cr_2O_7$

| | Range | Preferred |
|---|---|---|
| Wt. percent of $Na_2CrO_4$ in leach liquor | 20 to 45 | 40 to 45. |
| Conc. of by-product $NaHSO_4$ solution | 30 to 60 | 50 to 60. |
| Liters $NaHSO_4$ soln./liters yellow liquor | 0.2 to 1.4 | 0.5 to 0.8. |
| Conversion temp. (° C.) | 25 to 120 | 60 to 80. |
| pH of soln | 3.0 to 3.4 | 3.0 to 3.4. |

After filtration, this red liquor goes to a multiple effect evaporation system 5, together with a quantity of electrolytic cell liquor 6 produced in the electrolytic cell 11. The liquor contains a mixture of sodium bisulfate and sodium persulfate. The oxidation of the chloride ion can be carried out prior to or in conjunction with the concentration of the red liquor. Table II presents pertinent data concerning the chloride ion oxidation.

TABLE II

Removal of chloride ion; separation of $Na_2SO_4$

| | Range | Preferred |
|---|---|---|
| Liters cell liquor/liter of "red liquor" | 0.02 to 0.1 | 0.02 to 0.05 |
| Grams/liter (g./l.) $Na_2S_2O_8$ in cell liquor | 200 to 950 | 400 to 950. |
| G./l. $NaHSO_4$ in cell liquor | 0 to 400 | 0 to 400. |

The multiple effect evaporator is operated at about 3–15 p.s.i.g. pressure, and at temperatures of from 70 to 140° C. During the evaporation, the chloride ions present are oxidized to elemental chlorine 7 which at the temperatures employed in the evaporation, is driven off. Saleable by-product sodium sulfate 8 crystallizes out during the concentration and is separated from the bichromate solution. All or part of the sulfate may go to storage 9, but preferably, some of it (approximately 5% of the total crop) goes to vessel 10 where it is adjusted to $NaHSO_4$ with sulfuric acid, then routed to electrolytic diaphragm cell 11. The main product from the evaporator 5 comprising a concentrated solution of sodium bichromate 15, is transferred to a heated holding tank 16 and then to a crystallizer 17. Crystals of $Na_2Cr_2O_7 \cdot 2H_2O$ are obtained as a final saleable product 18 and the liquors 19 are recirculated back to the evaporator 5.

The by-product $Na_2SO_4$ (10) to be electrolytically converted to sodium persulfate is approximately a 45% solution by weight based on $Na_2SO_4$. While by-product sodium bisulfate 13 from the production of chromic anhydried may be used as feed to the electrolytic cell, rather than the acidified sodium sulfate from the "red liquor" multistage evaporator, it is not preferred because of its heavier chromium contamination which may cause difficulty during electrolysis. To $Na_2SO_4$ solution 10 is added approximately the stoichiometric amount of $H_2SO_4$ (12) required to produce a solution of sodium bisulfate, according to the reaction:

$$Na_2SO_4 + H_2SO_4 \rightarrow 2NaHSO_4$$

The electrochemical oxidation of bisulfate to persulfate may be carried out in cells without diaphragms if the cathodes are wrapped with asbestos, or other non-reactive permeable material compatible with the system. The temperature of the cell may be maintained between about 0° and 40° C., preferably between 25° and 35° C. An EMF of from 5 to 15 volts may be applied, preferably from 5 to 12 volts. The resulting anode current density may vary from 30 to 100 amperes, per square decimeter, preferably from 50 to 100. The electrochemical oxidation may be continued until the concentration of $Na_2S_2O_8$ is between 200 and 950 g./l., preferably between 400 and 950 g./l.

The product 6 of the electrolytic cell 11 comprising a mixture of sodium bisulfate and sodium persulfate is divided into two streams. One stream is fed to the evaporator 5 for oxidation of the chloride ion in the red liquor and the other stream is used to convert the trivalent chromium values to hexavalent values in the bisulfate solution 27 which is used to react with the yellow liquor 2.

According to a preferred method of the present invention, chromic anhydride is prepared by taking a portion of the crystalline sodium bichromate 20 produced in the crystallizer 17 passing it to a dissolving kettle 21 and there redissolving it in a quantity of water at a temperature of about 80° C. to provide a solution having a concentration of about 70% based on $Na_2Cr_2O_7$. The hot saturated solution is then crystallized in the dissolving vesel, or a separate crystallizer at a temperature of about 100–140° C. to crystallize out sodium bichromate anhydrous, $Na_2Cr_2O_7$ (22). The filtrate 23 may be recycled to the multistage evaporator 5. The anhydrous $Na_2Cr_2O_7$ (22) is transferred to a conversion kettle 24 to which a sulfuric acid 25 is added with agitation to produce chromic anhydride ($CrO_3$) and by-product $NaHSO_4$ (13).

It is possible to eliminate the crystallization of the anhydrous sodium bichromate and add the sulfuric acid directly to the $Na_2Cr_2O_7 \cdot 2H_2O$, and drive off the water during the conversion step to $CrO_3$.

At the temperature employed, both the $CrO_3$ (28) and the $NaHSO_4$ (13) are in liquid states, and are separated by one of the several methods of phase separation for immiscible liquids. Table III presents pertinent data on the preparation of chromic anhydride.

TABLE III

| | Range | Preferred |
|---|---|---|
| Oleum (20% $SO_3$) grams/gram $Na_2Cr_2O_7$. | 0.68 to 0.74 | 0.70 to 0.72. |
| Temperature | 197° to 203° C | 197° to 200° C. |
| Time required for conversion | 0.5 to 1 hr | 0.5 to 1 hr. |

The molten chromic anhydride 28 is transferred to a flaking roll and packaged as a saleable product 26.

The by-product sodium bisulfate 13 as $NaHSO_4$ containing a small amount of water is transferred to an oxidizing vessel 29. This material, contaminated with trivalent chromium as well as decomposition products brought about by the high temperatures attained during the bichromate/chromic anhyride conversion, after cooling and some dilution with water is treated in vessel 29 with the second stream 6' of electrolytic cell product comprising sodium bisulfate and sodium persulfate. Table IV presents pertinent data concerning the oxidation of the trivalent chromium values.

TABLE IV

| | Range | Preferred |
|---|---|---|
| Percent of $NaHSO_4$ in solution | 30 to 60 | 50 to 60. |
| Grams $Na_2S_2O_8$/gram Cr(III) | 6 to 9 gr | 7.0 to 8.5 gr. |
| Temperature, ° C | 60 to 115 | 60 to 70. |
| Time | 1.0 to 4.0 hrs | 1.5 to 3.0 hrs. |
| pH | 0 to 1 | 0 to 0.5. |

Example 1

300 grams of a sodium bisulfate by-product contaminated with hexavalent and trivalent chromium and derived from a typical chromic anhydride manufacturing operation, is dissolved in 200 grams of water form a solution containing 0.24% trivalent chromium Cr(III). The solution is heated to 60° C. and treated with an electrochemical cell product containing 8.4 grams of sodium persulfate. The mixture is maintained at 60° C. for 3 hours whereupon chemical analysis indicates that the Cr(III) content has decreased to 0.04%, corresponding to oxidation of about 83% of the trivalent chromium to hexavalent chromium. The method of analysis consists of a direct determination of the remaining trivalent chromium by precipitation as $Cr(OH)_3$ with ammonia followed by re-solution in dilute sulfuric acid, oxidation by ceric sulfate, and titration of the hexavalent chromium thus formed with a standard sodium nitrite solution.

The thus treated sodium bisulfate is then combined at 80° C. with a strong aqueous solution of sodium chromate ("yellow liquor" derived from roast leaching operations) containing about 540 grams of $Na_2CrO_4$ per liter and small amounts of residual $Na_2CO_3$ and NaCl from raw materials used in the process. The bisulfate and chromate solutions are combined in proportions to give a pH close to that of bichromate; that is, about 3.0. Thus, 234 grams of the bisulfate solution is treated as described above and 500 grams of the chromate solution produce 734 grams of a "red liquor" containing essentially sodium bichromate (174 grams as $Na_2CR_2O_7 \cdot 2H_2O$) and sodium sulfate (166 grams as $Na_2SO_4$) along with a small amount of chloride ion (0.53 gram as NaCl). Some of the $Na_2SO_4$ in the "red liquor" system thus produced crystallizes out of solution at 80° C. The mixture is evaporated to remove 321 grams of water, whereupon most of the remaining $Na_2SO_4$ separates out and 240 grams of a liquor is obtained containing 168 grams of $Na_2Cr_2O_7 \cdot 2H_2O$, 0.63 gram of $Na_2SO_4$, and 0.60 gram of NaCl. The liquor is treated for chloride removal by adding an electrochemical cell product containing 1.15 grams of sodium persulfate. The mixture is maintained at the boiling point (115° C.) for one hour. During this period chlorine gas escapes from the system; chemical analysis indicates that the chloride content is reduced from 0.15% Cl to 0.05% Cl, corresponding to 67% removal of chloride ion under these conditions.

Final evaporation of the thus treated liquor causes separation of most of the remaining $Na_2SO_4$ and yields a liquor containing about 83% $Na_2Cr_2O_7 \cdot 2H_2O$ by weight, which is a suitably purified feed for crystallization of the product $Na_2Cr_2O_7 \cdot 2H_2O$.

The sodium persulfate used to oxidize the Cr(III) and the Cl⁻ is prepared by the electrochemical oxidation of a sample of by-product sodium sulfate derived from the bichromate-sulfate separation by combining 106.5 grams of by-product sodium sulfate with 73.4 grams of concentrated sulfuric acid and 270 grams of water to produce a solution containing 40% by weight $NaHSO_4$. 200 ml. (267 grams) of this solution is transferred into a single-compartment electrochemical cell provided with a platinum anode of surface area 42 cm.² and platinum cathode of surface area 84 cm. ². The latter is wrapped with asbesetos cord which functions as a diaphragm to minimize cathodic reduction of persulfate. The cell is cooled externally by an ice-brine bath wherey the electrolytic temperature is maintained at 25–35° C. during the electrolysis. A current of 10 amperes is obtained with an applied voltage of 10–12 volts. The progress of the electrochemical formation of persulfate is monitored by chemical analysis. Current efficiency decreases uniformly during the electrolysis from 527 after the first 5 ampere-hours to 23% after 33 ampere hours. At this point, 35% of the bisulfate has been converted to persulfate, yielding a cell product containing 191 grams/liter $Na_2S_2O_8$.

Examples 2 and 3

These examples illustrate the efficient removal of the chloride ion at abnormally high concentration levels.

A solution containing 750 grams $Na_2Cr_2O_7 \cdot 2H_2O$, 500 grams $H_2O$ and 27.4 grams NaCl is treated with 61.2 grams of sodium persulfate (10% in excess of the stoichiometric amount) and the mixture heated to 115° C. for 100 minutes. At the end of this period, the mixture contains only 0.005 Cl⁻, corresponding to removal of over 99% of the chloride ion.

In another run, a slurry containing 350 grams $$Na_2Cr_2O_7 \cdot 2H_2O$$

98.7 grams $H_2O$, 1.3 grams $Na_2SO_4$ and 50.0 grams NaCl, is treated with 112 grams of sodium persulfate (10% in excess of the stoichiometric amount), and the mixture heated to 118° C. for 95 minutes. At the end of this period the mixture contains only 0.015% Cl⁻ corresponding to removal of 99.8% of the chloride.

Example 4

This example illustrates the effect of temperatures and concentration on the oxidation of Cr(III) in by-product sodium bisulfate.

A 60% solution of by-product sodium sulfate from the production of chromic anhydride contaminated with 0.203% ioinic Cr(III) is divided into two portions and oxidized with 1.2 times the stoichiometric quantity of $Na_2S_2O_8$ at (a) 60° C., and (b) 70° C.

| Hours |  | | | |
|---|---|---|---|---|
| | 0 | 1 | 2 | 3 |
| Oxidation temperature, ° C.: | | | | |
| 60 | 0.18 | 0.066 | 0.021 | 0.018 |
| 70 | 0.20 | 0.018 | 0.017 | 0.016 |

At 60° C., 3 hours are required to oxidize 90% of the Cr(III) to Cr(VI), whereas at 70° C. this is accomplished in one hour.

The novel series of steps comprising the method of the present invention constitute a substantial process improvement:

(a) The troublesome "brown muds" encountered in those methods of the prior art which attempt to recover the acid values in the by-product bisulfate, have been eliminated.

(b) Both the trivalent and hexavalent chromium values in the by-product bisulfate which were formerly lost with the "brown muds" are now recovered.

(c) The troublesome filtration of the "brown muds" has been eliminated.

(d) Disposal of the "brown mud" is no longer necessary. This is an important consideration, particularly in view of the pollution problem.

(e) A second step in converting chromate to bichromate has been eliminated since the pH can be held at 3.0–3.5 rather than at 5.0, at which pH, filtration becomes possible, but completion of the conversion does not. At pH 3.0–3.5 complete conversion is obtained in one step.

(f) Less evaporative equipment is required, which also represents a saving in fuel.

(g) No foreign ions are introduced to complicate purification.

(h) No additional raw material is required.

(i) Less sulfuric acid is required than with most methods of the prior art.

(j) Chloride ion contamination is removed easily and efficiently.

While this invention has been described with reference to certain specific examples and illustrative embodiments, it is not intended that the application be thereby limited except insofar as it appears in the accompanying claims.

We claim:

1. A process for reducing the trivalent chromium content of an aqueous alkali metal bisulfate solution which comprises reacting a sufficient amount of an alkali metal persulfate with said aqueous solution under reaction conditions sufficient to oxidize substantially all of the trivalent chromium values in said bisulfate solution to hexavalent chromium, said conditions including maintaining said reaction solution at a temperature between about 60° to the boiling point of said solution and recovering said bisulfate solution substantially free of trivalent chromium values.

2. The process of claim 1 wherein the alkali metal bisulfate is sodium bisulfate prepared by reacting an aqueous sodium bichromate solution with a sulfuric acid at elevated temperatures to produce a sodium bisulfate product containing chromic acid and separating the bisulfate from said chromic acid.

3. The process of claim 1 wherein the oxidation is carried out at a temperature between 60° C. and 115° C.

References Cited
UNITED STATES PATENTS

| | | | |
|---|---|---|---|
| 841,278 | 1/1907 | Suchy | 423—520 |
| 1,924,710 | 8/1933 | Demont | 423—53 |
| 2,839,359 | 6/1958 | Dunning | 423—53 X |
| 2,993,756 | 7/1961 | Marlatt et al. | 423—520 |
| 3,065,055 | 11/1962 | Perrin et al. | 423—520 |
| 3,137,541 | 6/1964 | Cooke | 423—57 |
| 3,314,747 | 4/1967 | Carlin | 423—58 |
| 3,451,766 | 6/1969 | Schafer et al. | 423—53 X |

HERBERT T. CARTER, Primary Examiner

U.S. Cl. X.R.

423—520, 53, 61, 596, 607